United States Patent [19]

Field

[11] Patent Number: 4,672,727
[45] Date of Patent: Jun. 16, 1987

[54] METHOD OF FABRICATING FILM COOLING SLOT IN A HOLLOW AIRFOIL

[75] Inventor: Robert E. Field, Tequesta, Fla.
[73] Assignee: United Technologies Corporation, Hartford, Conn.
[21] Appl. No.: 812,098
[22] Filed: Dec. 23, 1985
[51] Int. Cl.⁴ .......................... B21K 3/04; B23P 15/02
[52] U.S. Cl. ............................... 29/156.8 B; 29/527.2; 29/156.8 H; 29/535; 29/DIG. 26; 416/97 R
[58] Field of Search ................... 29/156.8 B, 156.8 H, 29/527.2, DIG. 26, 530; 415/DIG. 1; 416/90 R, 97 R

[56] References Cited

U.S. PATENT DOCUMENTS

| | | | |
|---|---|---|---|
| 2,149,510 | 3/1939 | Darricus | 29/156.8 B X |
| 2,220,420 | 11/1940 | Meyer | 29/156.8 H |
| 3,515,499 | 6/1970 | Beer et al. | 416/95 |
| 3,527,543 | 9/1970 | Howald | 416/97 R X |
| 4,303,374 | 12/1981 | Braddy | 416/97 R |
| 4,565,490 | 1/1986 | Rice | 416/97 R X |
| 4,601,638 | 7/1986 | Hill et al. | 416/97 R |

Primary Examiner—Howard N. Goldberg
Assistant Examiner—Ronald S. Wallace
Attorney, Agent, or Firm—Stephen E. Revis

[57] ABSTRACT

In the fabrication of a hollow airfoil having a longitudinally extending slot in the airfoil wall with the slot outlet at the external surface of the airfoil, a metering passage extending from the coolant compartment within the airfoil to the slot for carrying a metered amount of coolant fluid into the slot is formed by machining a passage completely through the wall from the external surface to the internal surface and which intersects the slot. The portion of the passage between the slot and the external surface of the airfoil is blocked, such as with a plug or by welding. With this fabrication method metering passages for directing coolant fluid from inside the airfoil into the slot may be formed without access to the interior of the airfoil. Coolant fluid from the interior flows into the slot through the unblocked portion of the passage and thereupon flows out of the airfoil through the slot as a film of coolant over the surface of the airfoil.

5 Claims, 16 Drawing Figures

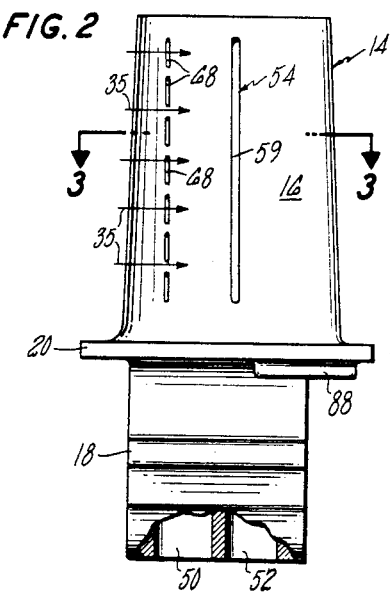
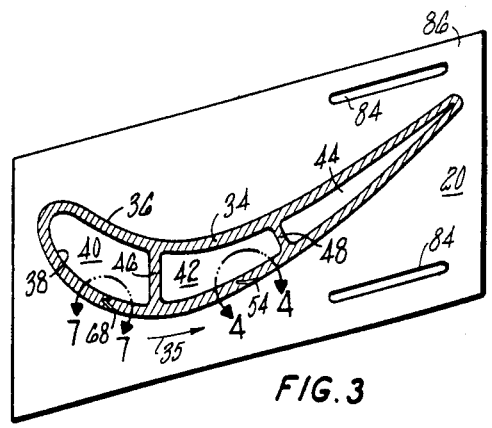
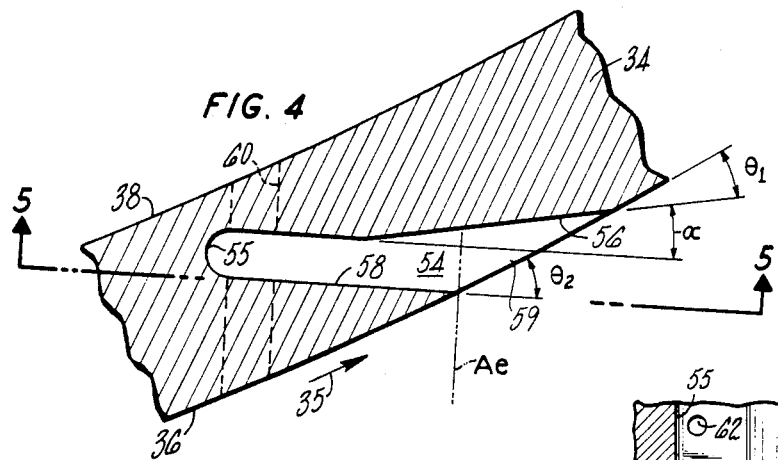
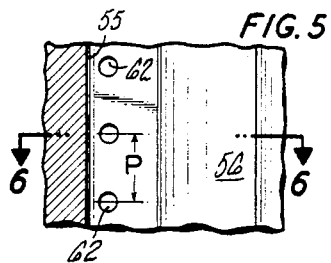
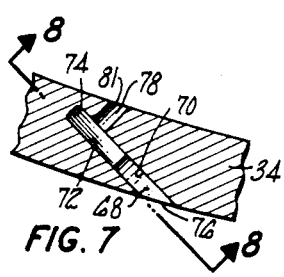
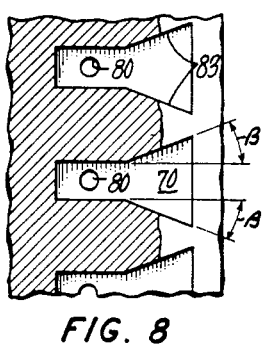
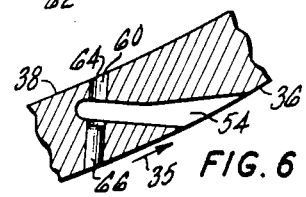

FIG. 15 PRIOR ART
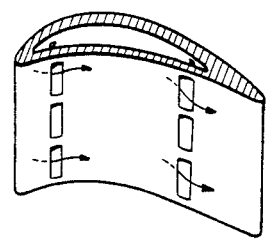
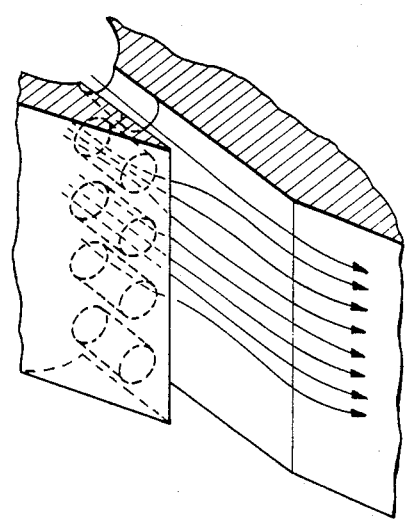
FIG. 16 PRIOR ART

METHOD OF FABRICATING FILM COOLING SLOT IN A HOLLOW AIRFOIL

TECHNICAL FIELD

This invention relates to the manufacture of airfoils.

BACKGROUND ART

It is well known the external surface of airfoils may be cooled by conducting cooling air from an internal cavity to the external surface via a plurality of small passages. It is desired that the air exiting the passages remain entrained in the boundary layer on the surface of the airfoil for as long a distance as possible downstream of the passage to provide a protective film of cool air between the hot mainstream gas and the airfoil surface. The angle which the axis of the passage makes with the airfoil surface and its relation to the direction of hot gas flow over the airfoil surface at the passage breakout are important factors which influence film cooling effectiveness. Film cooling effectiveness E is defined as the difference between the temperature of the main gas stream ($T_g$) and the temperature of the coolant film ($T_f$) at a distance x downstream of the passage outlet, divided by the temperature difference between the temperature of the main gas stream and the coolant temperature ($T_c$) at the passage outlet (i.e., at x=0) thus, $E=(T_g-T_f)/(T_g-T_c)$. Film cooling effectiveness decreases rapidly with distance x from the passage outlet. Maintaining high film cooling effectiveness for as long a distance as possible over as large a surface area as possible is the main goal of airfoil film cooling.

It is well known in the art, that the engine airfoils must be cooled using a minimum amount of cooling air, since the cooling air is working fluid which has been extracted from the compressor and its loss from the gas flow path rapidly reduces engine efficiency. Airfoil designers are faced with the problem of cooling all the engine airfoils using a specified, maximum cooling fluid flow rate. The amount of fluid which flows through each individual cooling passage from an internal cavity into the gas path is controlled by the minimum cross-sectional area (metering area) of the cooling passage. The metering area is typically located where the passage intersects the internal cavity. The total of the metering areas for all the cooling passages and orifices leading from the airfoil controls the total flow rate of coolant from the airfoil, assuming internal and external pressures are fixed or at least beyond the designer's control. The designer as the job of specifying the passage size and the spacing between passages, as well as the shape and orientation of the passages, such that all areas of the airfoil are maintained below critical design temperature limits determined by the airfoil material capability, maximum stress, and life requirement considerations.

Ideally, it is desired to bathe 100% of the airfoil surface with a film of cooling air; however, the air leaving the passage exit generally forms a cooling film stripe no wider than or hardly wider than the dimension of the passage exit perpendicular to the gas flow. Limitations on the number, size, and spacing of cooling passages results in gaps in the protective film and/or areas of low film cooling effectiveness which may produce localized hot spots. Airfoil hot spots are one factor which limits the operating temperature of the engine.

U.S. Pat. No. 3,527,543 to Howald uses divergently tapered passages of circular cross section to increase the entrainment of coolant in the boundary layer from a given passage. The passages are also preferably oriented in a plane extending in the longitudinal direction or partially toward the gas flow direction to spread the coolant longitudinally upon its exit from the passage as it moves downstream. Despite these features, it has been determined by smoke flow visualization tests and engine hardware inspection that the longitudinal width of the coolant film from an eliptical passage breakout (i.e. Howald) continues to expand longitudinally only about a maximum of one passage exit minor diameter after the coolant is ejected on the airfoil surface. This fact, coupled with typical longitudinal spacing of three to six diameters between passages, result in areas of airfoil surface between and downstream of longitudinally spaced passages which receive no cooling fluid from that row of passages. Conical, angled passages as described in Howald U.S. Pat. No. 3,527,543 provide at best probably no more than 70% coverage (percentage of the distance between the centers of adjacent hole breakouts which is covered by coolant).

The velocity of the air leaving the cooling passage is dependent on the ratio of its pressure at the passage inlet to the pressure of the gas stream at the passage outlet. In general the higher the pressure ratio, the higher the exit velocity. Too high an exit velocity results in the cooling air penetrating into the gas stream and being carried away without providing effective film cooling. Too low a pressure ratio will result in gas stream ingestion into the cooling passage causing a complete loss of local airfoil cooling. Total loss of airfoil cooling usually has disastrous results, and because of this a margin of safety is usually maintained. This extra pressure for the safety margin drives the design toward the high pressure ratios. Tolerance of high pressure ratios is a desirable feature of film cooling designs. Diffusion of the cooling air flow by tapering the passage, as in the Howald patent discussed above is beneficial in providing this tolerance, but the narrow diffusion angles taught therein (12° maximum included angle) require long passages and, therefore, thick airfoil walls to obtain the reductions in exit velocities often deemed most desirable to reduce the sensitivity of the film cooling design to pressure ratio. The same limitation exists with respect to the trapezoidally shaped diffusion passages described in Sidenstick, U.S. Pat. No. 4,197,443. The maximum included diffusion angles taught therein in two mutually perpendicular planes are 7° and 14°, respectively, in order to assure that separation of the cooling fluid from the tapered walls does not occur and the cooling fluid entirely fills the passage as it exits into the hot gas stream. With such limits on the diffusing angles, only thicker airfoil walls and angling of the passages in the airfoil spanwise direction can produce wider passage outlets and smaller gaps between passages in the longitudinal direction. Wide diffusion angles would be preferred instead, but cannot be achieved using prior art teachings.

Japanese Pat. No. 55-114806 shows, in its FIGS. 2 and 3 (reproduced herein as prior art FIGS. 15 and 16), a hollow airfoil having straight cylindrical passages disposed in a longitudinal row and emptying into a longitudinally extending slot formed in the external surface of the airfoil. While that patent appears to teach that the flow of cooling fluid from adjacent passages blends to form a film of cooling fluid of uniform thickness over the full length of the slot by the time the cooling fluid exits the slot and reaches the airfoil surface, our test experience indicates that the coolant fluid from the cylindrical passages moves downstream as a stripe of essentially constant width, which is substantially the diameter of the passage. Any diffusion which results in blending of adjacent stripes of coolant fluid occurs so far downstream that film cooling effectiveness at that point is well below what is required for most airfoil designs.

U.S. Pat. No. 3,515,499 to Beer et al describes an airfoil made from a stack of etched wafers. The finished airfoil includes several areas having a plurality of longitudinally spaced apart passages leading from an internal cavity to a common, longitudinally extending slot from which the cooling air is said to issue to form a film of cooling air over the airfoil external surface. In FIG. 1 thereof each passage appears to converge from its inlet to a minimum cross-sectional area where it intersects the slot. In the alternate embodiment of FIG. 9, the passage appears to have a small, constant size which exits into a considerably wider slot. Both configurations are likely to have the same drawbacks as discussed with respect to the Japanese patent; that is, the cooling fluid will not uniformly fill the slot before it enters the main gas stream, and considerably less than 100% film coverage downstream of the slot is likely.

Other publications relating to film cooling the external surface of an airfoil are: U.S. Pat. Nos. 2,149,510; 2,220,420; 2,489,683; and "Flight and Aircraft Engineer", No. 2460, Vol. 69, 3/16/56, pp. 292–295, all of which show the use of longitudinally extending slots for cooling either the leading edge or pressure and suction side airfoil surfaces. The slots shown therein extend completely through the airfoil wall to communicate directly with an internal cavity. Such slots are undesireable from a structural strength viewpoint; and they also require exceedingly large flow rates.

U.S. Pat. No. 4,303,374 shows a configuration for cooling the exposed, cut-back surface of the trailing edge of an airfoil. The configuration includes a plurality of longitudinally spaced apart, diverging passages within the trailing edge. Adjacent passages meet at their outlet ends to form a continuous film of cooling air over the cut-back surface.

A serial publication, "Advances in Heat Transfer", edited by T. F. Irvine, Jr. and J. P. Hartnett, Vol. 7, Academic Press (N.Y. 1971) includes a monograph titled *Film Cooling*, by Richard J. Goldstein, at pp. 321–379, which presents a survey of the art of film cooling. The survey shows elongated slots of different shapes extending entirely through the wall being cooled, and also passages of circular cross section extending through the wall.

DISCLOSURE OF INVENTION

One object of the present invention is to enable the fabrication of an airfoil having a film coolant slot therein wherein metering passages leading from an internal airfoil compartment to the slot may be formed without access to the interior of the airfoil.

According to the present invention, in the fabrication of a hollow airfoil having an interior coolant compartment and a longitudinally extending slot in the airfoil wall, which slot extends from its base within the wall to the slot outlet at the external surface of the airfoil, a metering passage extending from the coolant compartment to the slot for carrying a metered amount of coolant fluid into the slot is formed by machining a passage completely through the wall and which intersects the slot, including the further step of blocking a portion of such passage between the external surface of the airfoil and the slot to prevent the escape of coolant fluid from the slot through the blocked portion of the passage.

This invention is for use in the manufacture of a hollow airfoil wherein coolant from a cavity within the airfoil is fed into a spanwise extending slot formed in the wall of the airfoil via one or more metering passages which extend from the internal compartment to intersect with the slot. The coolant fluid from the passages fills the slot and exits from the slot outlet as a thin film on the external surface of the airfoil downstream of the slot. In some gas turbine engine applications the metering passages must be made very small and must be accurately sized. They must also be positioned precisely such that when the slot is machined or otherwise formed in the wall of the airfoil the metering passages intersect the slot at the proper locations. When the airfoil is cast as a single piece (as opposed to as separate halves which are later bonded together) there is no access to the interior of the airfoil for purposes of machining the metering passages. The present invention avoids the necessity and the difficulty of casting such metering passages at the time the airfoil is cast.

With the present invention the metering holes are machined from outside the airfoil, such as by ordinary drilling, electrodischarge machining, electrochemical machining, laser drilling, or the like. The metering passages are drilled completely through the airfoil wall, intersecting the slot, typically near the base of the slot, at the desired location. The outer portion of the drilled passage is then blocked by any suitable means, such as by bonding or brazing a plug within the passage, applying a surface weld to the opening of the passage at the external surface of the airfoil, or imply by applying a coating to the surface of the airfoil, which coating blocks the passage. The other end of the passage, which opens into the internal compartment of the airfoil, receives coolant fluid from the internal compartment and directs it into the slot. The coolant fluid cannot escape from the airfoil through the blocked end of the passage; and therefore all of it diffuses within the slot and exits from the slot outlet.

The number of metering passages per slot depends upon the length of the slot, the cross-sectonal area of the slot outlet, and the cross-sectional area of the metering passages. The size and orientation of the slot and the size and spacing between the metering passages is selected to assure that coolant fluid exits the slot as a continuous film attached to the external airfoil surface over the full length of the slot outlet. Parameters are also preferably selected such that the maximum amount of airfoil surface area is adequately cooled using the minimum amount of coolant.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 2 is a side elevation view, partly broken away, of a hollow turbine blade of the rotor of FIG. 1.

FIG. 3 is a sectional view taken along the line 3—3 of FIG. 2.

FIG. 4 is an enlarged view of the area 4—4 of FIG. 3 showing a cooling passage configured according to one embodiment of the present invention.

FIG. 5 is a sectional view taken along the line 5—5 of FIG. 4.

FIG. 6 is a sectional view taken along the line 6—6 of FIG. 5.

FIG. 7 is an enlarged view of the area 7—7 of FIG. 3 showing another embodiment of a coolant passage according to the present invention.

FIG. 8 is a sectional view taken along the line 8—8 of FIG. 7.

FIGS. 15 and 16 are reproductions of FIGS. 2 and 3, respectively, of prior art Japanese Patent No. 55-114806.

BEST MODE FOR CARRYING OUT THE INVENTION

Figure 1:
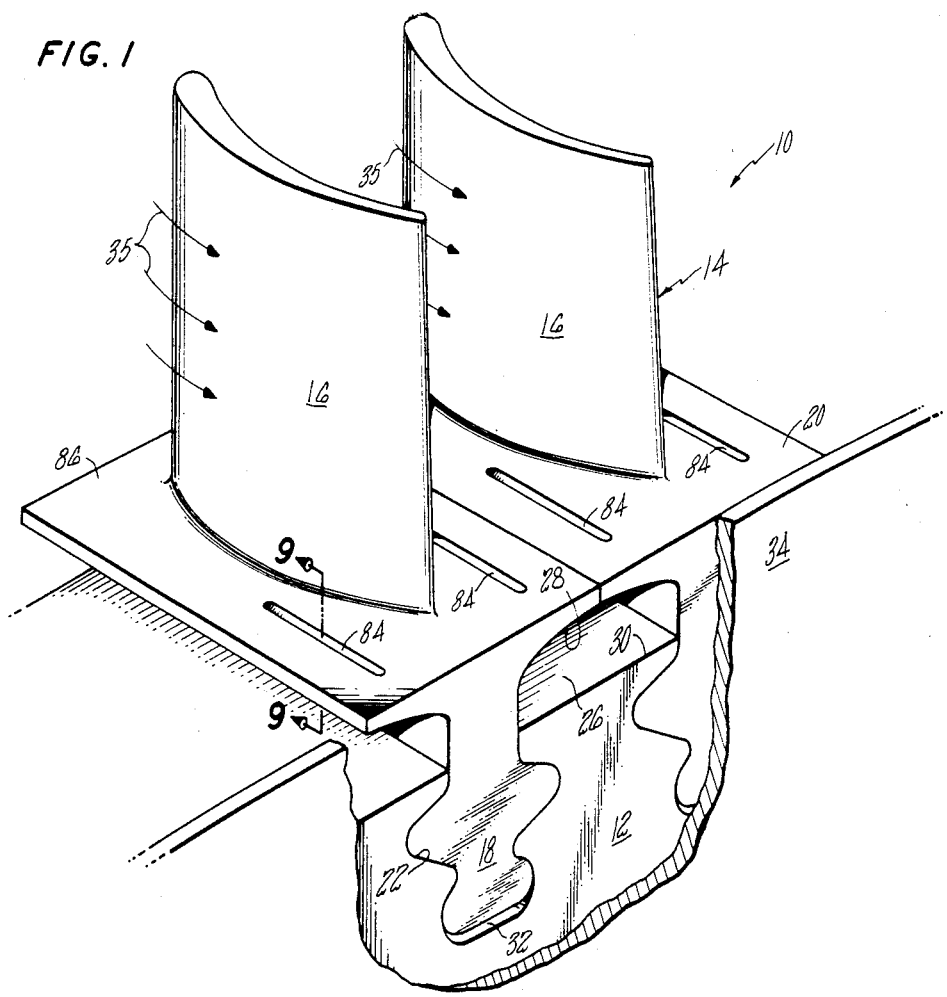
FIG. 1 is a perspective view of a portion of a rotor assembly for a gas turbine engine.

As an exemplary embodiment of the present invention, consider FIG. 1 which is a simplified perspective view of a portion of a turbine assembly 10 of a gas turbine engine. The assembly 10 comprises a disk 12 having a plurality of blades 14 securely attached thereto. In this embodiment each blade 14 comprises a hollow airfoil 16 which extends in a spanwise or longitudinal direction from a root 18 which is integral therewith. A platform 20 is disposed at the base of the airfoil 16 and is also integral therewith. The airfoil is substantially perpendicular to the platform. In this embodiment the root 18 has a conventional fir-tree shape and fits within a corresponding fir-tree slot 22 in the rim of the disk 12. Side plates or other suitable means may abut the axially facing end surfaces of the blades 14 and disk 12 to retain the blades within the disk and to control the flow of coolant fluid across the turbine stage through the compartments 26 (formed between the undersides 28 of the platforms and the rim 30 of the disk) as well as through the axially extending channel 32 under each root 18. In FIG. 1 a side plate 34 is shown disposed on the downstream side of the turbine assembly 10. Such side plates and other gas turbine engine components and features (not shown) which interact with the turbine assembly 10 control the pressure and flow of the coolant fluid within the compartments 26 and passages 32 in a manner well known in the art.

Referring to FIG. 2, one of the blades 14 is shown in side view removed from the disk 12. As best shown in FIGS. 2 and 3, the airfoil 14 comprises a wall 34 having an outer surface 36 and an inner surface 38. The inner surface 38 defines a longitudinally extending internal cavity which is divided into a plurality of adjacent longitudinally extending compartments 40, 42, 44, by longitudinally extending ribs 46, 48. A passage 50 within the root 18 communicates with the compartment 40; and a passage 52 within the root 18 communicates with both compartments 42 and 44. During operation of the engine the passages 50, 52 are fed pressurized coolant fluid from the channel 32 (FIG. 1). This fluid may be compressor bleed air, for example.

In accordance with one embodiment of the present invention, the airfoil 16 includes a longitudinally extending slot 54 in the suction side of the airfoil wall 34. The slot 54 extends over substantially the full spanwise length of the airfoil, although this is not a requirement. Referring also to FIGS. 4 and 5, the slot 54 is comprised of a base 55 and a pair of closely spaced apart, oppositely facing, longitudinally extending surfaces 56, 58 which intersect the external surface 36 of the airfoil to form a longitudinally extending slot outlet 59. A plurality of metering passages 60 within the wall 34 intersect the surface 56 near the base 55 of the slot 54 to form metering passage outlets 62. The other end of each passage 60 intersects the inner wall 38 of the airfoil 16 to define metering passage inlets 64. The passages 60 are longitudinally spaced apart along the length of the slot 54 and provide a metered flow of coolant fluid from the compartment 42 into the slot. Although the passages 60 are shown as having a circular cross-section in this embodiment, the cross-sectional shape is not critical to the present invention.

The passages 60 are preferably oriented to direct the coolant fluid from their outlets 62 at a sharp angle against the opposite surface 58 of the slot to produce impingement cooling of the wall and to spread the coolant fluid within the slot. In this preferred embodiment, the passages 60 direct coolant fluid against the surface 58 at a 90° angle. Preferably the angle is no less than 60°. For angles less than 90° it is preferred to direct the fluid toward the base 55 of the slot rather than toward the slot outlet.

Throughout this specification and in the claims the downstream direction is considered to be the direction of the hot gases or working medium over the external surface of the airfoil. This direction is represented in the drawing by arrows 35. The slot 54 is oriented such that the coolant fluid exiting therefrom has a major component of velocity in the downstream direction. This requires that the slot surfaces 56, 58 intersect the external surface 36 of the airfoil at shallow angles, represented by the greek letters $\theta_1$ and $\theta_2$ in FIG. 4. These angles are preferably no greater than about 40°, and most preferably no greater than 30°. In this embodiment the surfaces 56, 58 are parallel from the slot base 55 to a point just past the outlets 62 of the metering passages 60. The surface 56 then diverges from the surface 58 at a small angle $\alpha$ preferably between about 5° and 10°. This further diffuses the coolant flow and helps direct it closer to the airfoil surface downstream of the slot outlet.

The slot 54 and passages 60 may be manufactured by any suitable means. The most desireable means for manufacturing these features will depend upon several factors, such as the method for manufacturing the blade 14, the material from which the blade is made, and the size of the features, particularly the size of the metering passages 60 which, for some applications, may need to be as small as 0.010 inch in diameter. If the blade is a single piece casting it becomes difficult and expensive to cast very small diameter metering passages. One method for forming such passages after the blade has been cast is best described with reference to FIG. 6. The slot 54 may either be cast into the airfoil at the time the blade is cast, or it may be machined into the cast airfoil, such as by electro-discharge machining (EDM) or other suitable technique. Metering passages 60 of the appropriate size are machined completely through the thickness of the wall 34 from outside the airfoil, such as by laser drilling, EDM, or other suitable technique. A plug 66 made from a small rod is then brazed, welded, or otherwise bonded into place within that portion of the machined passage forward of the slot surface 58. Alternatively, a surface weld could be used to close the passage at the external surface. Even the application of a ceramic thermal barrier coating applied to the external surface of the airfoil may be sufficient to plug the passage.

As mentioned above, the most appropriate number of metering passages 60 is dependent upon, among other things, the spanwise length of the slot and its cross-sectional outlet area relative to the cross-sectional outlet area of the metering passage. As an example of an extreme case, the airfoil 16 of FIG. 2 includes a row of slots 68 each having a relatively short length in the spanwise direction. Each slot 68 includes a pair of closely spaced apart, longitudinally extending, facing surfaces 70, 72, respectively. In this embodiment, the surfaces 70, 72 are parallel to each other over from the base 74 of the slot to the outlet 76. Each slot 68 is fed by a single metering passage 78 which intersects the surface 70 at a 90° angle to form the metering passage outlet 80. The metering passage inlet 81 communicates with the cavity 40. Also, in this alternate embodiment, the facing end walls 83 of each slot 68 diverge from each other at an included angle equal to twice the angle $\beta$. Angle $\beta$ may be any angle from 0° to 40°.

Figure 9:
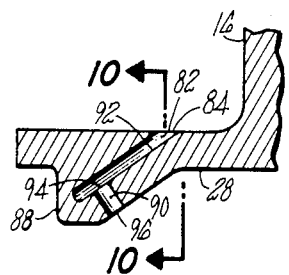
FIG. 9 is a sectional view taken generally along the line 9—9 of FIG. 1 showing coolant passages of the present invention used for airfoil platform cooling.
Figure 10:
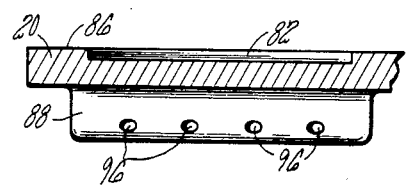
FIG. 10 is a sectional view taken along the line 10—10 of FIG. 9.

An alternate application for the coolant passages of the type described with respect to FIGS. 2–8 is for cooling the platforms 20 (FIG. 1) of the blades 14. This application is best described with respect to FIGS. 1, 9, and 10. A slot 82 similar to the slot 54 of FIG. 2 is cast or otherwise formed in the platform 20 and has its elongated outlet 84 at the surface 86 of the platform, over which the hot mainstream gas flow of the engine passes. In this embodiment, the underside 28 of the platform 40 includes a radially inwardly extending protrusion 88 along the length of the slot to permit the slot to be made deeper. A plurality of metering passages 90 in the protrusion 88 intersect the surface 92 of the slot at the preferred angle of 90° to form metering passage outlets 94. The metering passage inlets 96 communicate with the coolant fluid in the compartment 26 below the platforms, which receives cooling air at a greater pressure than the pressure of the cooling air in the mainstream gas flow at the slot outlet 84.

For purposes of clarity the blade shown in FIG. 1 has been greatly simplified. An actual turbine airfoil might, for example, include several slots, like the slot 54, and several rows of slots, like the slots 68, or spanwise rows of coolant passages of other configurations which may be well known in the art. These slots and passages could be on either the pressure or suction side of the airfoil. The blade platform could also include additional slots, like the slot 84, at other locations. Thus, the blade shown in the drawing is intended to be illustrative only and not limiting.

For purposes of comparison, a coolant passage having a shape similar to that described with respect to FIGS. 2–5 was tested against a row of shaped holes shown in FIGS. 11–13, hereinafter referred to as the "baseline" configuration. The graph of FIG. 14 shows the test results. In FIG. 14 the horizontal axis is a dimensionless parameter P whose value is the ratio of the distance x from the outlet of the cooling passage (in the direction of the mainstream gas flow over the outlet) to a number directly related to the mass flow rate of cooling air exiting the passage. The vertical axis is a measure of the film cooling effectiveness E (as hereinabove defined) measured at the distance x downstream of the passage outlet. The maximum possible cooling effectiveness is 1.0. Because P is directly related to distance from the passage outlet, and since the distance downstream of the outlet is the only variable in these tests, P may be considered as a measure of distance downstream of the passage outlet.

Figure 11:
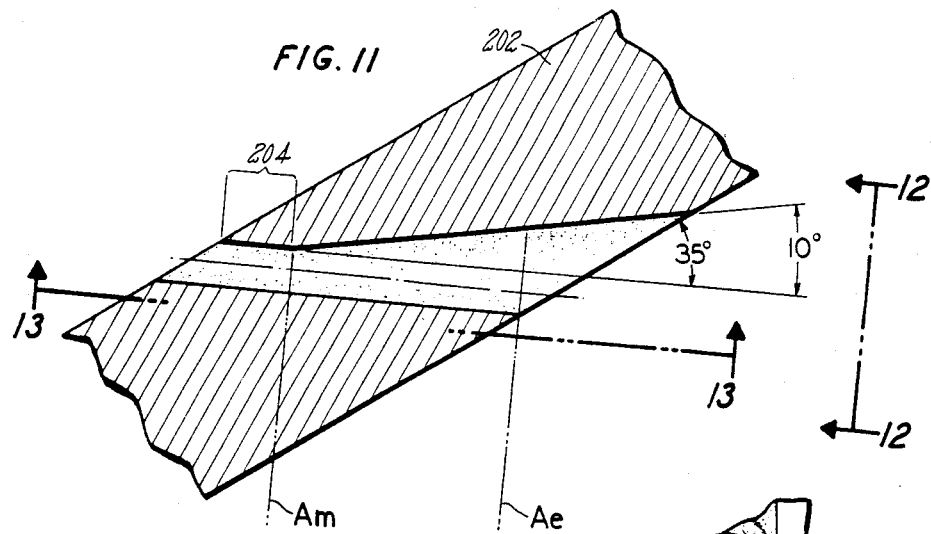
FIGS. 11-13 show the baseline cooling passage configuration against which comparisons of the present invention may be made.
Figure 12:
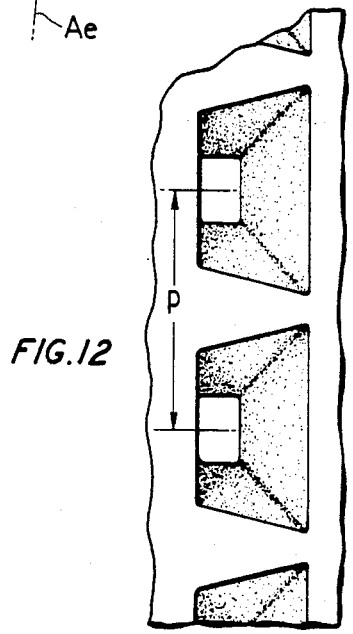
Figure 13:
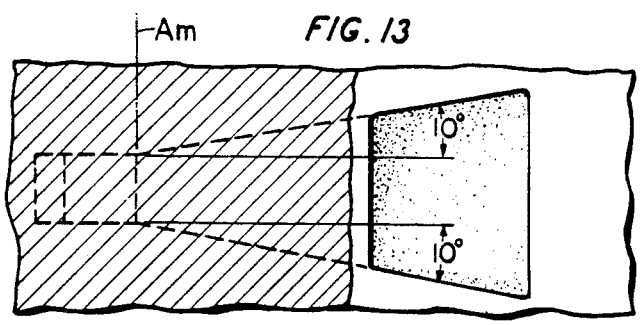
Figure 14:
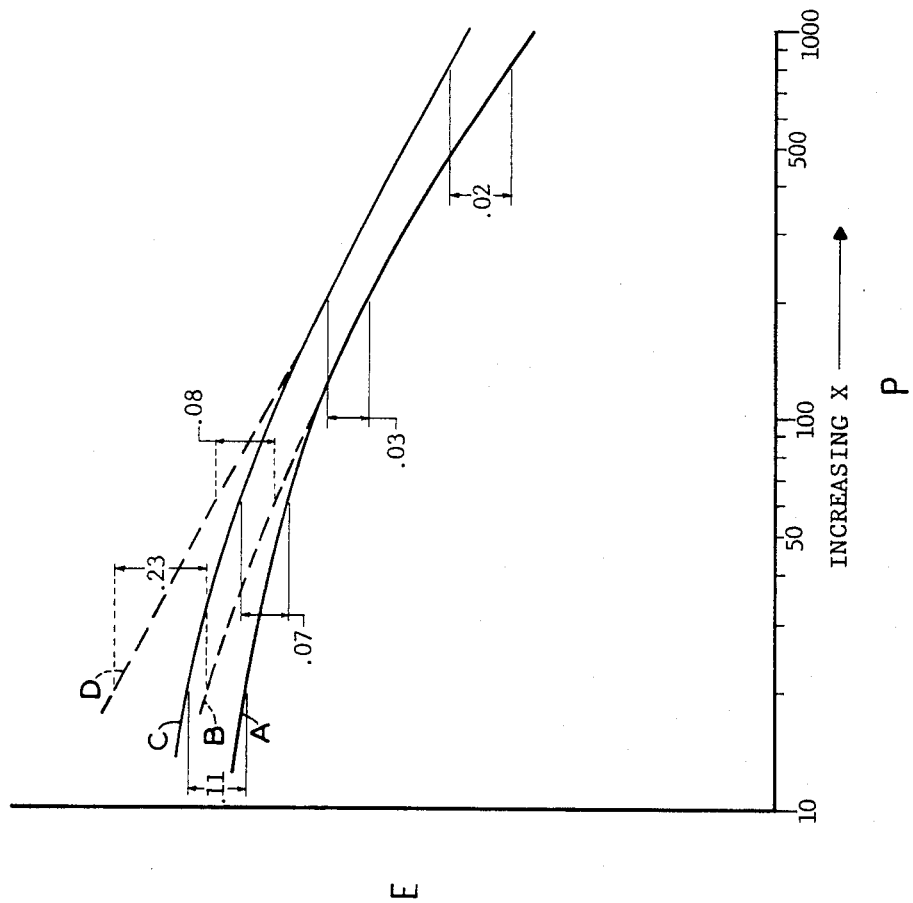
FIG. 14 is a graph which may be used to compare the film cooling effectiveness of a coolant passage configuration of the present invention to that of the baseline configuration of FIGS. 11-13.

The curve labeled A is for a row of baseline coolant passages through a test plate 202 such as shown in FIGS. 11–13. The baseline configuration is similar to the coolant passages described in Sidenstick, U.S. Pat. No. 4,197,443, except the divergence angles are 10°. The area ratio $A_c/A_m$ for each passage was 10.0, where $A_c$ is the cross-sectional area of the passage outlet measured in the plane labeled $A_c$ in FIG. 11, and where $A_m$ is the cross-sectional area of the metering section 204 (FIG. 11) as measured in the plane labeled $A_m$. The pitch to diameter ratio, p/d, was 6.58, wherein small p (FIG. 12) is the distance between the centers of adjacent metering sections 204, and d is the effective diameter of the metering section, which is the diameter of a circle having the same cross-sectional area $A_m$. We found these baseline passages to flow "full", thereby producing a coolant film of substantially the same width as the passage outlet, despite the teaching of Sidenstick which suggests maximum divergence angles of 7°.

The curve labeled B is for a baseline configuration the same as shown in FIGS. 11–13, having a pitch to diameter ratio p/d of 6.57 and an area ratio $A_c/A_m$ of 3.6.

The curve C is for a coolant passage according to the present invention formed in a flat test plate and similar in cross-sectional appearance to FIGS. 4 and 5. Using the labels appearing in FIGS. 4 and 5, $\theta_1$ was 30° $\theta_2$ was 40°, $\alpha$ was 10°, the area ratio $A_c/A_m$ was 12.0, and the pitch to diameter ratio p/d as 6.22. $A_c$ was measured in the plane having that designation in FIG. 4, which plane is perpendicular to the surface 58. $A_m$ was the cross-sectional area of the metering passage at its outlet 62. The pitch p was the spacing between the metering passages 60, as shown in FIG. 5. And, the diameter d was the diameter of the metering passage outlets 62.

The curve D represents data for a coolant passage according to the present invention, but where the surfaces 56, 58 of the slot are parallel from their base to the slot outlet (i.e., $\alpha = 0°$). In that test, $\theta_2$ was 40°, the pitch to diameter ratio was 6.57, and the area ratio was 4.0.

The tests depicted by curves A and C were conducted in a curved wind tunnel, while the tests depicted by curves B and D were conducted in a planar wind tunnel. As between curves B (baseline) and D (invention), at 20 units distance and 80 units distance the invention provided an increase in film cooling effectiveness of 0.23 and 0.08, respectively. With respect to the configurations represented by curves A and C, at 20, 60, 200 and 800 units distance the invention provided an increase in film cooling effectiveness of 0.11, 0.07, 0.03 and 0.02, respectively. To put this in perspective, assuming a coolant temperature at the passage outlet of 1200° F. and a mainstream gas temperature of 2600° F., at 0.02 increase in cooling effectiveness translates into about a 28° F. decrease in the temperature of the coolant film the same mass flow rate of coolant.

Although the invention has been shown and described with respect to a preferred embodiment thereof, it should be understood by those skilled in the art that other various changes and omissions in the form and detail of the invention may be made without departing from the spirit and scope thereof.

I claim:

1. In the fabrication of a hollow, longitudinally extending airfoil including a wall having an outer surface defining the external shape of the airfoil and having an inner surface defining at least a portion of a coolant compartment within said airfoil, the steps of:

forming a slot within said wall, the slot having a base within said wall and comprising a pair of spaced apart, facing side surfaces extending from the base to the outer surface to form a longitudinally extending slot outlet at the outer surface;

machining, from the outer surface of the wall toward the inner surface of the wall, at least one passage through the wall intersecting both slot side surfaces and intersecting the inner surface of the wall at the coolant compartment to form the inlet of a metering passage for carrying a metered amount of coolant fluid from the coolant compartment into the slot; and blocking the passage between the outer surface of the airfoil and the slot to prevent the escape of coolant fluid from the slot through the passage.

2. The fabrication of a hollow airfoil according to claim 1, wherein said step of blocking comprises disposing a plug within the passage between the outer surface of the airfoil and the slot.

3. The fabrication of a hollow airfoil according to claim 1, wherein said step of blocking comprises applying a surface weld over the opening of the passage at the outer surface of the airfoil.

4. The fabrication of a hollow airfoil according to claim 1, wherein said step of blocking comprises applying a coating to the outer surface of the airfoil, which coating completely covers the opening of the passage at the outer surface of the airfoil.

5. The fabrication of a hollow airfoil according to claim 1 wherein the passage is machined at an angle of between 60° and 90° to the first surface of the slot which it intersects.

* * * * *